United States Patent
Väänänen et al.

(10) Patent No.: US 6,764,305 B2
(45) Date of Patent: Jul. 20, 2004

(54) DEVICE FOR SUPPORTING A CONVEYOR BELT USED IN THE CONTINUOUSLY OPERATED SINTERING OF A MATERIAL BED

(75) Inventors: Eero Väänänen, Tornio (FI); Martti Jankkila, Tornio (FI); Olavi Tulkki, Tornio (FI)

(73) Assignee: OUTOKUMPU Oyj, Espoo (FI)

( * ) Notice: Subject to any disclaimer, the term of this patent is extended or adjusted under 35 U.S.C. 154(b) by 0 days.

(21) Appl. No.: 10/362,474

(22) PCT Filed: Aug. 24, 2001

(86) PCT No.: PCT/FI01/00744
§ 371 (c)(1),
(2), (4) Date: Feb. 24, 2003

(87) PCT Pub. No.: WO02/16850
PCT Pub. Date: Feb. 28, 2002

(65) Prior Publication Data
US 2003/0183492 A1 Oct. 2, 2003

(30) Foreign Application Priority Data
Aug. 25, 2000 (FI) .............................................. 20001882

(51) Int. Cl.[7] ................................................. F27D 3/00
(52) U.S. Cl. ......................................... 432/121; 432/58
(58) Field of Search ............................... 432/8, 58, 59, 432/121

(56) References Cited

U.S. PATENT DOCUMENTS 756,600 A * 4/1904 Dodge .......................... 198/811
4,316,718 A    2/1982 Drugge

FOREIGN PATENT DOCUMENTS

DE           24 46 566         4/1975

OTHER PUBLICATIONS

WPI/Derwent's Abstract, Accesssion No. 1982–B1377E, week 198205, Abstract of SU 823236, published Apr. 1981.
WPI/Derwent's Abstract, Accession No. 1989–276601, week 198938, Abstract of SU 1465370, published Mar. 1989.

* cited by examiner

Primary Examiner—Jiping Lu
(74) Attorney, Agent, or Firm—Smith-Hill and Bedell

(57) ABSTRACT

The invention relates to a device for supporting a conveyor belt used in the continuously operated thermal treatment, i.e. sintering, of a material bed. According to the invention, in the top part of the frame structure of the belt conveyor, there is installed at least one support element, whereby an essentially smooth slide surface can be obtained for the conveyor belt, and in the interior of the support element there is made a channel system in order to enable the flow-through of the intermediate agent fed into the support element.

12 Claims, 3 Drawing Sheets

Figure 1:
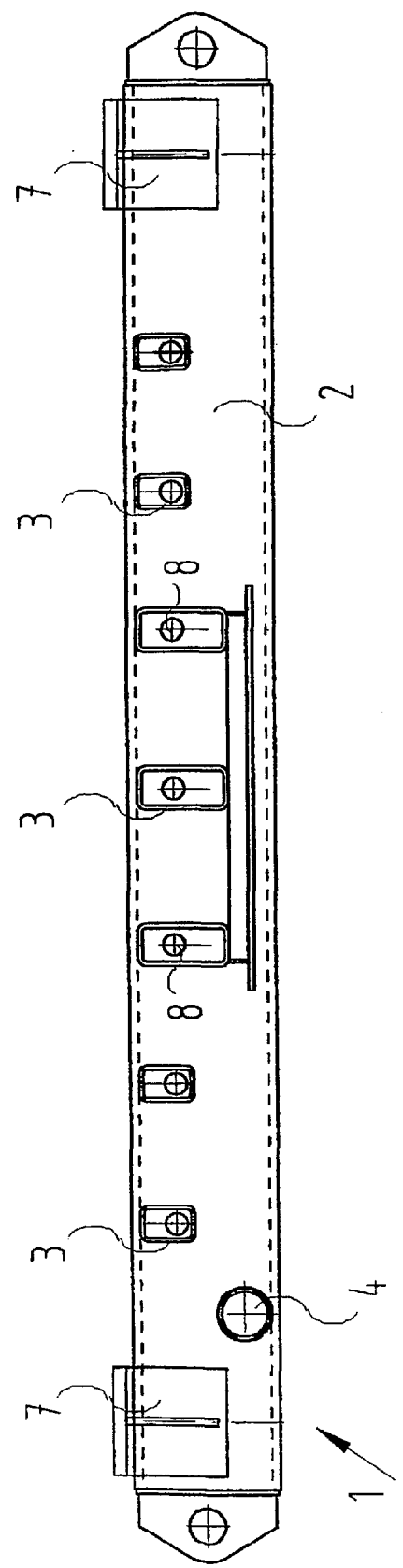

DEVICE FOR SUPPORTING A CONVEYOR BELT USED IN THE CONTINUOUSLY OPERATED SINTERING OF A MATERIAL BED

The present invention relates to a device for supporting a conveyor belt used in the continuously operated thermal treatment of a material bed, i.e. in sintering, and also to improving the motional properties of the belt.

In continuously operated sintering, there is nowadays generally used a conveyor-type sintering device, where on the conveyor belt, there is first formed a material bed. The material bed usually consists of spherical, fragile pellets, which by means of a high-temperature treatment, i.e. sintering, are hardened so that the pellets can be fed to further treatment, for instance to a smelting furnace. In the sintering of a material bed, through the material bed located on the conveyor belt, and simultaneously through the conveyor belt itself, there is first conducted hot gas, so that the temperature of the material bed rises, for instance in the case of ferroalloy pellets, up to the range of 1300–1600° C. At a high temperature, the fragile pellets react with the hot gas and are hardened in the process. Thereafter the hardened pellets obtained in the material bed are cooled by conducting cooling gas through the material bed and the conveyor belt. Thus the conveyor belt employed in continuously operated sintering is used under remarkable fluctuations of temperature.

In order to reduce the powerful temperature changes directed to the conveyor belt, the conveyor belt is supported, at least in the part for transporting the material bed, by a support structure which can be cooled and which also serves as the slide surface for the conveyor belt. Normally the employed support structure is an arrangement where the gas used in the cooling process is fed in through the slide surface formed on top of the support bar and the support structure, meets the conveyor belt and is exhausted along the rest of the process gases, which as such forms a strain for the exhaust gas blasters and gas cleaning equipment. At the same time, this reduces the amount of gas flowing through the material bed to be sintered, which results in a poorer quality of pellets and in a reduced capacity of the sintering device. Another problem is that the exact spot where the cooling gas is exhausted has not been known, because particularly a worn conveyor belt begins to blister and is not at all spots evenly attached to the slide surface provided on the top surface of the supporting structure. Consequently the cooling gas is exhausted at spots where the resistance is lowest and leaves the rest of the support structure and slide surface uncooled.

The object of the present invention is to alleviate the drawbacks of the prior art and to realize an improved device for supporting the conveyor belt employed in the continuously operated thermal treatment, i.e. sintering, of a material bed, in which device the support structure of the conveyor belt comprises at least one support element that is easily installed and removed, and in which device the cooling gas advantageously circulates throughout the whole support structure. The essential novel features of the invention are apparent from the appended claims.

According to the invention, the support element used for supporting a conveyor belt employed in the continuously operated thermal treatment, i.e. sintering, of a material bed, comprises two end parts and at least two, mutually parallel supporting parts that are spaced apart and connected to said end end parts. The supporting parts are parallel and spaced apart in order to enable an essentially unobstructed passage of the process gases, used in the thermal treatment, i.e. sintering, of the material bed, to the conveyor belt and further through the apertures provided in the conveyor belt. Thus, in aligning the supporting parts with respect to the conveyor belt, the structure of the conveyor belt is taken into account.

The support and end parts of the support element are made to be cavernous, so that the cooling agent used in the cooling process can be conducted as a flow-through via the cavities. Moreover, the support element is provided with at least one adjusting member in order to ensure an essentially accurate alignment when assembling the support element. Further, at least one pair of wheels is advantageously attached to the support element in order to facilitate the replacement of the support element, for instance so that one wheel is provided at each end part.

Depending on the length of the conveyor belt employed in the continuously operated thermal treatment, i.e. sintering, of a material bed, one or several support elements according to the invention are used for supporting the conveyor belt. From the point of view of the continuously operated thermal treatment, i.e. sintering, of the material bed, it is preferable that in the various process steps, where the temperature may fluctuate within a wide range, there are used separate support elements. When using two or more support elements, the end parts of two successive support elements are in the operational position installed adjacently to each other. In that case the end parts of the support element are placed transversally with respect to the proceeding direction of the conveyor belt. The supporting parts connecting the end parts are advantageously connected to the end parts at essentially right angles, in which case the supporting parts are in the operating position essentially parallel to the proceeding direction of the conveyor belt.

According to the invention, in the end part of the support element of the conveyor belt employed in the continuously operated thermal treatment, i.e. sintering, of a material bed, there also is formed a connecting part for feeding cooling agent to the support element and for conducting cooling agent out of the support element. The end parts and the supporting parts connected to the end parts are cavernous, in which case the cooling agent is made to pass as a flow-through through the support element, advantageously as separate from the rest of the process gases used in the thermal treatment, i.e. sintering, of the material bed. When using two or more support elements, the support elements can be combined, in relation to the cooling agent, so that one and the same cooling agent is made to flow through all elements. When using two or more support elements, the support elements can also be connected, in relation to the cooling agent, so that each support element functions as a separate unit, or for example so, that two successive support elements are connected to each other, while the same amount of cooling agent passes through both support elements. Advantageously the employed cooling agent is gas, such as air.

When necessary, the channel system formed by the support element cavities can also be used so that instead of the cooling agent, for instance a heating agent, such as heated air, is fed into the support element, for example in a case where the equipment used in the thermal treatment, i.e. sintering, of a material bed is not in use, and the weather conditions are such that heating is required.

In order to align the support element according to the invention in a desired position with respect to the conveyor belt, in order to prevent any bending of the conveyor belt, the support element is provided with a least one adjusting member by which the height of the support element is, during installation, advantageously adjusted with respect to the conveyor belt and the rest of the support elements. The height difference between a support element and the rest of the support elements, achieved by means of the adjusting member, is advantageously less than 0.5 mm, in which case the support for the conveyor belt is made essentially uniform throughout the whole supported area of the conveyor belt. Thus the conveyor belt is advantageously made to slide along an essentially uniform slide surface formed of the top surface of the end parts and supporting parts of the support element, which as such reduces the damages caused by the high temperature in the conveyor belt. The sliding of the conveyor belt can be further enhanced by feeding onto the slide surface a lubricating agent, and the heating of said agent is likewise restricted by means of the cooling agent conducted through the support element.

Figure 2:
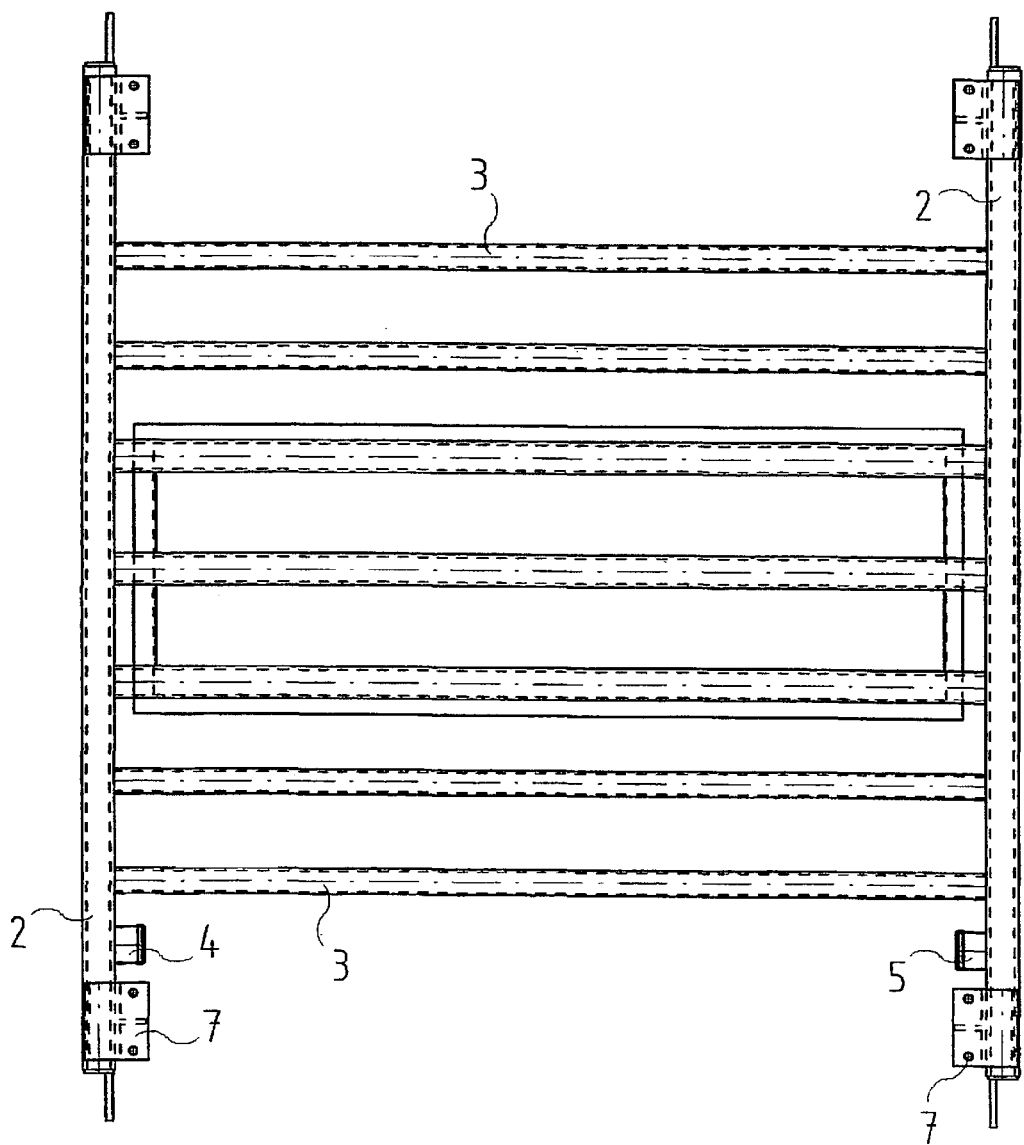
Figure 3:
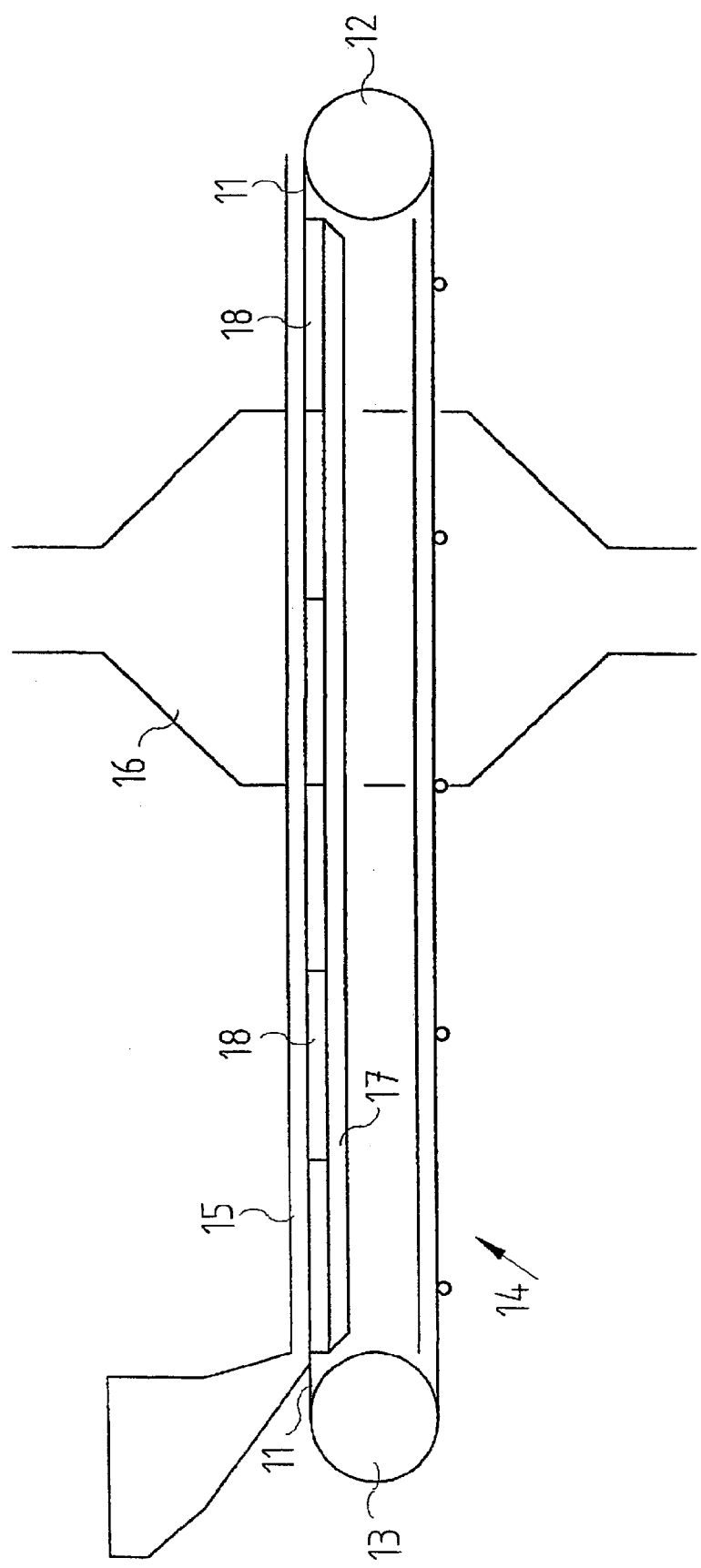

The invention is explained in more detail with reference to the appended drawings, where FIG. 1 shows a preferred embodiment of the invention in a schematical side-view illustration, FIG. 2 shows the preferred embodiment of FIG. 1 in a schematical top-view illustration, and FIG. 3 illustrates the preferred embodiment of FIG. 1 as installed in a continuously operated sintering arrangement.

In FIGS. 1 and 2, the end parts 2 of the support element 1 are interconnected by supporting parts 3. In the end part 2, there is installed a conduit member 4 in order to feed cooling or heating agent into the support element 1, and a conduit member 5 in order to conduct cooling or heating agent out of the support element 1. The end parts 2 and the supporting parts 3 are hollow, so that inside the support element 1, there is formed a channel system 8, where the cooling or heating agent can be conducted from the inlet conduit member 4 to the outlet conduit member 5. In addition, the end part 2 is provided with an adjusting screw 7, whereby the height of the support element 1 can be adjusted to be advantageous with respect to the rest of the support elements and the conveyor belt.

In FIG. 3, the conveyor belt 11 is installed on a belt conveyor 14 comprising a drawing drum 12 and a folding drum 13, so that the conveyor belt 11 transports the material bed 15 located on the belt through the sintering arrangement 16. In order to support the conveyor belt 11, in the top part of the frame structure 17 of the conveyor 14, there are installed support elements 18 according to the invention, which elements also provide an essentially smooth slide surface for the conveyor belt 11.

What is claimed is:

1. A belt conveyor for use in continuous thermal treatment of a material bed, comprising a conveyor belt having an elongate upper run and also comprising a frame structure for supporting the upper run of the conveyor belt, wherein the frame structure includes at least one hollow support element defining an interior space, the support element comprises two end members that extend lengthwise of the upper run of the conveyor belt at opposite respective edges of the upper run and at least two transverse members that are mutually parallel and are spaced lengthwise of the upper run of the conveyor belt, the support element has an inlet opening and an outlet opening for enabling a flow of heat-transfer fluid through the interior space of the support element, and the interior space of the support element is otherwise substantially isolated from the exterior of the frame structure.

2. A belt conveyor according to claim 1, wherein the two end members and the transverse members are hollow and each defines an interior space, and the interior spaces of the end members and the transverse members are in communication with each other.

3. A belt conveyor according to claim 1, wherein the support element includes an adjusting member for selectively adjusting the height of the support element.

4. A belt conveyor according to claim 1, wherein the end members are connected by the transverse members and the transverse members are perpendicular to the end members for supporting the upper run of the conveyor belt.

5. A belt conveyor according to claim 1, wherein the end members and the transverse members have respective top surfaces that form an essentially uniform slide surface for the upper run of the conveyor belt.

6. A belt conveyor according to claim 1, wherein said hollow support element is a first of at least first and second hollow support elements each having an inlet opening and an outlet opening and wherein the outlet opening of the first support element is connected to the inlet opening of the second support element so that the heat transfer fluid passes successively through the interior spaces of the first and second support elements.

7. A belt conveyor according to claim 1, wherein said hollow support element is a first of at least first and second support elements and each support element is provided with at least one adjusting member for selectively adjusting the support element in height.

8. A belt conveyor for use in continuous thermal treatment of a material bed, comprising a conveyor belt and a frame structure for supporting an upper run of the conveyor belt, wherein the frame structure includes at least one hollow support element defining an interior space, the support element has an inlet opening and an outlet opening for enabling a flow of heat-transfer fluid through the interior space of the support element, and the interior space of the support element is substantially isolated from the ambient atmosphere.

9. A belt conveyor according to claim 8, wherein the support element includes an adjusting member for selectively adjusting the height of the support element.

10. A belt conveyor according to claim 8, wherein the support element has a top surface that forms an essentially uniform sues surface for the upper run of the conveyor belt.

11. A belt conveyor according to claim 8, wherein said hollow support element is a first of at least first and second hollow support elements each having an inlet opening and an outlet opening and wherein the outlet opening of the first support element is connected to the inlet opening of the second support element so that the heat transfer fluid passes successively through the interior spaces of the first and second support elements.

12. A belt conveyor according to claim 8, wherein said hollow support element is a first of at least first and second support elements and each support element is provided with at least one adjusting member for selectively adjusting the support element in height.

* * * * *